United States Patent [19]
Whikehart et al.

[11] 3,763,993
[45] Oct. 9, 1973

[54] PINCH ROLL DRIVE FOR ENDLESS CONVEYOR BELT

[75] Inventors: Richard E. Whikehart, Pepper Pike; Rudolph R. Patrick, North Olmsted, both of Ohio

[73] Assignee: McDowell-Wellman Engineering Company, Cleveland, Ohio

[22] Filed: July 28, 1972

[21] Appl. No.: 276,057

[52] U.S. Cl. .............................................. 198/203
[51] Int. Cl. .................................................. B65g 23/00
[58] Field of Search ................... 226/172, 176, 177; 198/203; 60/97 E

[56] References Cited
UNITED STATES PATENTS
| | | | |
|---|---|---|---|
| 3,227,345 | 1/1966 | Eckhardt | 226/176 |
| 2,759,596 | 8/1956 | Keller | 198/203 |
| 3,481,489 | 12/1969 | Stauffer | 60/97 E |
| 3,236,364 | 2/1966 | Mayrath | 198/233 |

Primary Examiner—Richard E. Aegerter
Attorney—Harold F. McNenny et al.

[57] ABSTRACT

There is provided a pinch roll drive for long distance conveyor belts. These drives are located at intervals along the belt and depend upon driving wheels frictionally engaging marginal drive edges of an endless conveyor belt. Pairs of wheels which may be separately driven are disposed above and below a given reach of the belt and traction loaded.

10 Claims, 6 Drawing Figures

PINCH ROLL DRIVE FOR ENDLESS CONVEYOR BELT

BACKGROUND OF THE INVENTION AND PRIOR ART

The present invention relates broadly to systems for conveying bulk materials and, more particularly, to drive mechanisms which are particularly useful in connection with conveyor systems which traverse long distances, for example ten miles, and which systems are particularly useful in transporting bulk material such as coal or overburden for reclamation of strip-mined lands and the like.

It has been found in conveyor belt systems of substantial length that the belt tension increases with distance from the tail pulley toward the head pulley rising to a maximum immediately ahead of the head or drive pulley. Since a simple fabric-reinforced conveyor belt is unable to withstand the tensions built up over a long distance, it was either necessary to use a multiplicity of short conveyor belts successively cascading material from one to the next over the distance to be traversed, or to redesign the conveyor belt itself to be able to withstand the excessively high tensile forces developed. To this end, the prior art has produced various types of wire rope-reinforced endless conveyor belts. The first of these provided a plurality of longitudinally extending cables embedded within the body of the endless belt at regularly spaced intervals extending entirely across the cross-section thereof from marginal edge to marginal edge. The cross-section of the belt so reinforced was rectangular. This type of belt is usually used for long distance hauls with drive mechanism located at the head and/or tail end of the belt.

A competing belt was developed abroad and, instead of having longitudinally extending cables, was provided with transversely extending steel stiffener rods at spaced intervals along the belt and embedded therein, and having along the marginal edges thereof enlarged rubber ribs adapted to be seated upon spaced drive cables of sufficient size to withstand the tensile forces developed over a long distance (see U. S. Pat. No. 3,343,652). Again, a single drive means at the head pulley was employed and was also necessarily of relatively large power output in order to be able to move a loaded belt over a long distance.

There has recently been developed an improved conveyor belt structure wherein longitudinally extending reinforcing cables are disposed in enlarged longitudinally extending marginal drive edges and wherein the intervening portion of the belt is without longitudinal reinforcement or transversely extending rods, all of the tensile load being carried in the integral marginal drive edges. The central portion is then quite flexible and provides a deep cup in troughing rollers for improved bulk material capacity.

The present invention relates to drive means which are capable of coacting with the marginal drive edges of such a conveyor belt at a plurality of points along the course traversed by the endless belt and intermediate the head and tail pulleys. A number of advantages are realized by the present invention. Primary among these is the fact that the maximum tension to which the belt is submitted is greatly reduced. Since the tension on the belt immediately following a belt drive falls to a minimum value, there is obtained a stepped profile for tension, the number of steps equaling the number of drive units employed. Since the maximum tension on the conveyor belt is thereby rendered only a fraction of the tension in a conventional conveyor system where the entire driving force is supplied by a head pulley, the endless conveyor belt itself may be constructed to considerably lower tensile strength specifications and hence at considerably lower cost.

Thus, the apparatus of the present invention solves the problems posed by the application of the driving force through a single head pulley or multiple pulley system at one end operative across the entire width of the belt by introducing the driving force for the conveyor belt along marginal drive edges at intervals along the reaches of the belt.

BRIEF STATEMENT OF THE INVENTION

Briefly stated, the present invention is in a drive unit for an endless conveyor belt having upper and lower reaches and marginal drive edges. The drive unit includes a frame adapted to span the upper reach of an endless conveyor belt intermediate the extremities of the upper reach. A first axle is mounted in the frame for disposition transversely of the belt and normal to the direction of travel of the endless belt and carries a pair of upper drive wheels mounted on the axle for frictional driving engagement with the upper surfaces of the marginal drive edges, respectively, of the upper reach of the belt. A second axle is mounted in the frame parallel to the first axle and carries thereon a pair of lower drive wheels carried on the second axle for driving engagement with the under surface of the marginal drive edges, respectively, of the upper reach of the belt and opposite of the drive wheels mounted on the first axle. Separate means are provided for rotatably driving the first and second axles. Finally, as an essential part of the invention, means are provided for traction loading between the first and second axles to pinch the respective marginal drive edges of the upper reach between the upper and lower drive wheels. In a preferred embodiment of the present invention, the drive wheels are pneumatic rubber-tired wheels, preferably having a Durometer rating which is lower than that of the endless cable-reinforced rubber belt.

Drive units of the class above described are disposed for driving contact with the upper reach of an endless conveyor belt at intervals therealong between the head pulley and the tail pulley. Similar driving units for coaction with the lower reach of the endless belt may also be provided either within the same framework as is used for supporting the drive unit coacting with the upper reach or in separate units. It has been found that because the lower reach of the belt is unloaded, fewer return drive units are required than are required for the loaded upper reach.

With the exception of the drive units of the present invention, a conveyor system for long distance transport of bulk material utilizes conventional troughing and idler rolls for the upper and lower reaches. The tail pulley assembly may be of conventional structure and include belt tensioning means. The head pulley also of conventional structure may or may not be driven, as desired.

BRIEF DESCRIPTION OF THE DRAWINGS

The invention may be better understood by having reference to the annexed drawings wherein:

FIG. 4 is a fragmentary cross-sectional view of the device shown in FIG. 2 as it appears in the broken plane indicated by the line 4—4 in FIG. 2.

FIG. 5 is a fragmentary end view of the apparatus shown as it appears in the plane indicated by the line 5—5 in FIG. 2 and showing the relationship of the horizontal and vertical guide rollers for the upper and lower reaches of the belt, respectively.

DETAILED DESCRIPTION OF THE DRAWINGS

Figure 1:
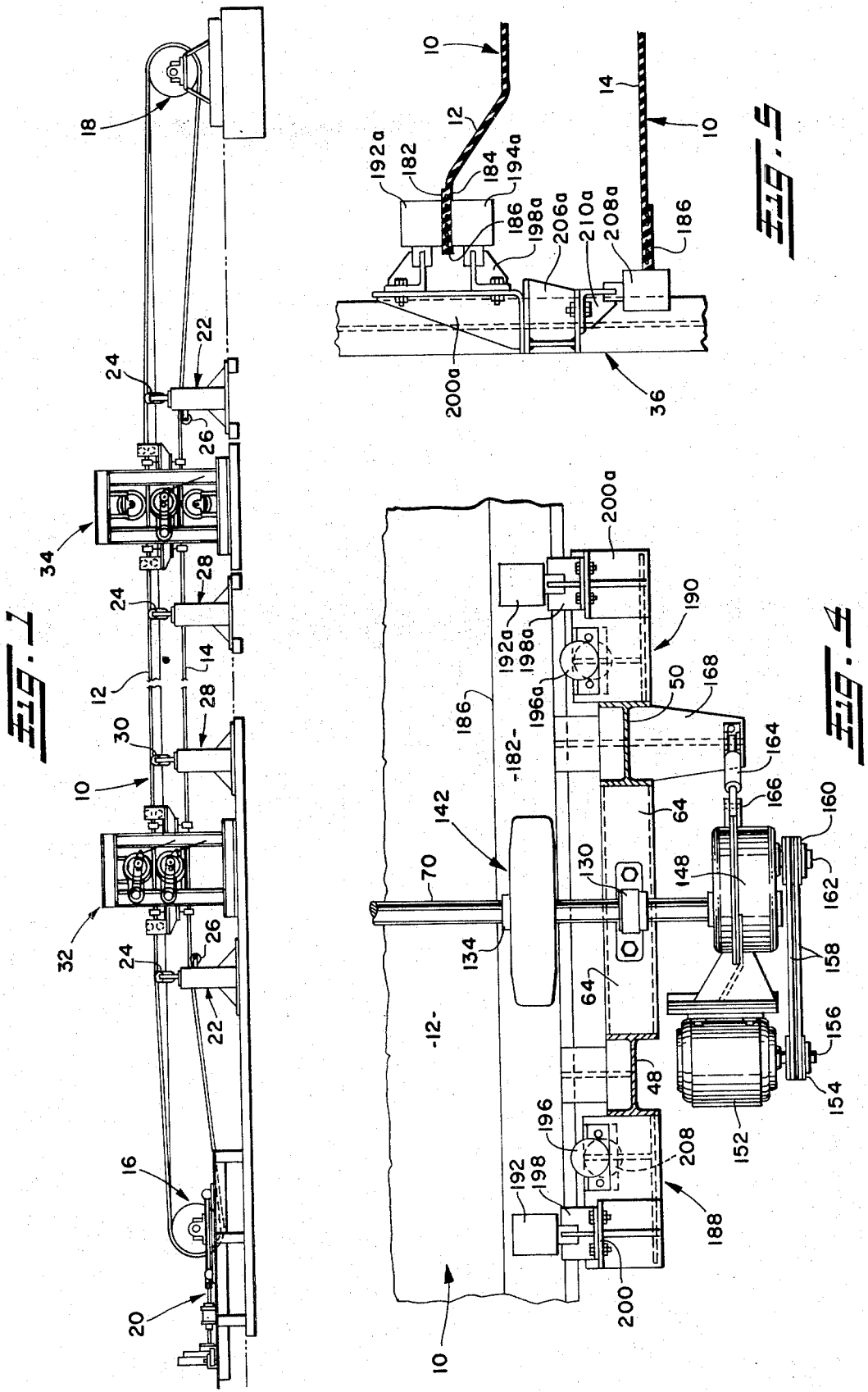
FIG. 1 is a general arrangement in side elevation showing a conveyor system in accordance with the present invention and showing two intermediately disposed drive units, one of which drives both the upper and the lower reaches.

Referring now more particularly to FIG. 1, there is here shown a general arrangement for a typical long distance endless conveyor belt for transporting bulk material and having drive units in accordance with the present invention located intermediate the extremity of the belt. Accordingly, there is shown an endless channel-type cable-reinforced rubber conveyor belt 10 having an upper reach 12 and a lower reach 14 coursing around a tail pulley assembly generally indicated at 16 and a head pulley assembly generally indicated at 18. Tail pulley assembly 16 is conveniently provided with belt tensioning apparatus of conventional structure generally indicated at 20. For the most part, the belt is supported on roller stations, for example roller station 22, having a troughing roll 24 and a return roll 26 of conventional design mounted thereon. Other roller stations, for example roller station 28, is provided with merely a troughing roll, e.g. troughing roll 30, in accordance with general conveyor practice, more support being required for the upper reach than is required for the return or lower reach. Drive units generally indicated at 32 and 34 illustrate different embodiments of the present invention. Drive unit 32, for example, is a four-wheel two-axle unit coacting with the upper reach only. Drive unit 34 is a six-wheel three-axle unit which is adapted to coact with the upper reach 12 and the lower reach 14. Drive units which coact only with the lower reach 14 are similar in design, construction, and operation to those which coact only with the upper reach 12, the location of the operative axle being arranged in a framework to accommodate only the lower reach 14.

Details of one embodiment of a drive unit in accordance with the present invention are shown in FIGS. 2, 3, 4, and 5 from which those skilled in the art are enabled to construct drive units such as that shown in FIG. 1 at 32, drive units such as that shown in FIG. 1 at 34, and a modification of the drive unit 32 for coaction with only the lower reach.

Referring now more particularly to FIGS. 2 – 5, inclusive, there is provided a box-like frame 36 including a base 38 formed of parallel side rails 40 and 42 and having parallel cross beams 44 and 46 extending therebetween to form a rectangular base 38. Vertical support members, e.g. support members 48, 50, and 52 (the fourth vertical member not shown) extend from the base 38, being suitably secured thereto as by welding, and support a second rectangular member 54 formed of side rails 56 and 58 and joined together by cross ties 60 and 62. The upper rectangular member 54 is also suitably welded to the vertical members such as vertical members 48, 50, and 52, to form a rigid box-like structure which spans the width of the endless conveyor belt 10 and provides support for the pinch roll drives and the guide rollers as hereinafter more particularly described. The frame 36 also includes a pair of intermediate side rails 64 and 66.

Supported for rotation within the framework 36 are drive axles 68 and 70. When a three-axle unit is utilized for driving both the upper reach 12 and the lower reach 14, a third axle 72 shown in phantom in FIGS. 2 and 3 may be carried in the frame 36. Ordinarily, however, the drive units for the upper reach 12 are separate from the drive units for the lower reach 14, and a structure similar to that shown in FIGS. 2 and 3 in the solid lines is a preferred structure for driving the upper reach 12. A separate unit composed of axles 70 and 72 (omitting axle 68) supported in a frame such as frame 36 is a preferred structure for driving the lower reach 14.

Figure 2:
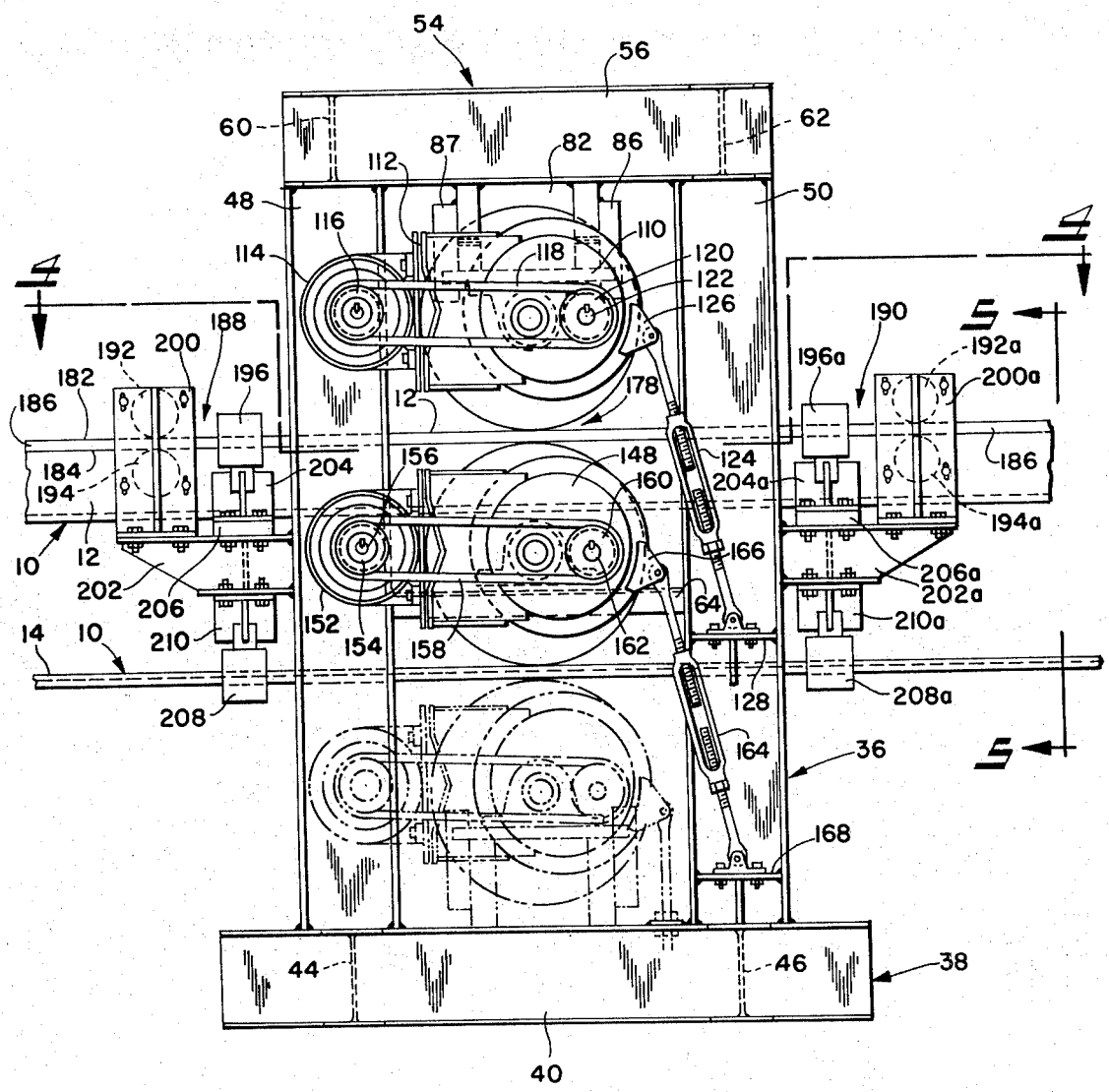
FIG. 2 is a side elevation of a drive unit in accordance with the present invention and shown in driving relation with the upper and lower reaches of a commercially available panel-type belt, and showing guide rollers coacting with the marginal drive edges thereof.

The axle 68 is mounted for rotation in pillow blocks 74 and 76 which are in turn mounted on vertically movable yokes 78 and 80. The yokes 78 and 80 are mounted on hydraulic jacks 82 and 84, respectively, the extremities of the yokes 78 and 80 being notched and guided by guide blocks 86 and 88. Hydraulic jacks 82 and 84 are, in turn, mounted on side rails 56 and 58, respectively. As shown in FIG. 2, the guide blocks are disposed as a pair, for example guide blocks 86 and 87. Thus, by means of the hydraulic jacks 82 and 84, the shaft 68 may be raised and lowered and traction loading force applied to the wheels as hereinafter described. The shaft 68 is also provided with hubs 90 and 92 suitably secured to the shaft 68 as by means of keys or splines as may be desired. Hubs 90 and 92 are provided, respectively, with hub discs 94 and 96 to which may be secured in a conventional manner conventional tire and rim assemblies 98 and 100. In a preferred embodiment, the conventional tire and rim assemblies are pneumatic high-speed boat trailer tires of the tubeless variety and, in operation in the devices of this invention, these are inflated to a pressure of approximately 55 psi. The tire rims 102 and 104, respectively, are conveniently fastened to the flanges 94 and 96, respectively, by conventional lug bolts. As indicated, the tire casings 106 and 108 may be of the tubeless variety and are desirably treadless or circumferentially grooved as is the case with high-speed boat trailer tires. Alternatively, passenger car tires, truck tires, or solid tires may be used.

Because of the desire to move the axles, for example axles 68 and 70, relatively one to the other toward and away from each other, it has been found most convenient to provide individual drives for each driven axle. A convenient structure has been found to be, for example, a shaft mounted reducer. Such shaft mounted reducers are conventional and commercially available. In the present embodiment, the shaft mounted reducer 110 has a 14.03:1 ratio. The reducer 110 is also provided with a motor mounting plate 112 to which is suitably secured a motor 114. The motor 114 is conveniently a five-horsepower 1,800 rpm open drop-proof squirrel cage motor. The motor 114 is fitted with a standard two groove drive pulley 116 which is connected by means of drive belts 118 to driven pulley 120 suitably mounted as for example by keying to input shaft 122 of the reducer 110. The ratio of drive pulley 116 to driven pulley 120 is conveniently 1:1. The shaft mounted reducer motor assembly is anchored to the frame 36 by a conventional turnbuckle link 124 coacting between a housing bracket 126 and a laterally extending mounting bracket 128.

The drive shaft 70 is equipped in substantially the same way as the drive shaft 68. Although it is not necessary for the shaft 70 to be vertically movable, it should be understood that vertical movement of the shaft 70 may be provided optionally.

Accordingly, the shaft 70 is mounted for rotation in pillow blocks 130 and 132 which are in turn mounted on side rails 64 and 66 carried by the frame 36. The shaft 70 is provided with hubs 134 and 136 suitably secured to the shaft 70 and provided with wheel mounting flanges or hub discs 138 and 140. Tire-and-rim assemblies 142 and 144 are of the same design and construction as tire-and-rim assemblies 98 and 100 mounted on shaft 68. While any suitable means for mounting the tire-and-rim assemblies 142 and 144 to the hub discs 138 and 140 may be employed, standard lug bolt mounting may be employed in order that the tire-and-rim assemblies may be removed easily for replacement.

It has also been found that the best results are secured when the pressure in the pneumatic tires mounted on a given axle is the same. To this end, it is desirable to provide a cross connection 146 between the tires of the tire-and-rim assemblies on the same axle, such as shown with tire-and-rim assemblies 142 and 144, for example, to ensure equalization of the pressures within the tires. Although such a connection is not shown in connection with the tires 106 and 108 mounted on shaft 68, it is to be understood that a connection such as cross connection 146 is optional although desired for all tires mounted on the same shaft.

In order to drive the shaft 70, there is provided a duplicate of the drive used to power the shaft 68. Thus, there is provided a shaft mounted reducer 148 to which is secured a motor mounting plate 150 having motor 152 secured thereto by any suitable means such as motor mounting bolts (not shown). A drive pulley 154 is mounted on the motor shaft 156 and connected by means of belts 158 to driven pulley 160 keyed to the reducer input shaft 162 for transmittal of power from the motor 152 to the reducer 148.

To anchor the motor-shaft mounted reducer assembly driving the shaft 70, there is provided a turnbuckle link 164 pivotally coacting between the reducer bracket 166 and a laterally extending mounting bracket 168 which is welded to the frame 36. It will be seen, therefore, that the separate drive arrangement for shaft 70 in a preferred embodiment is the same as that for driving the shaft 68.

Figure 3:
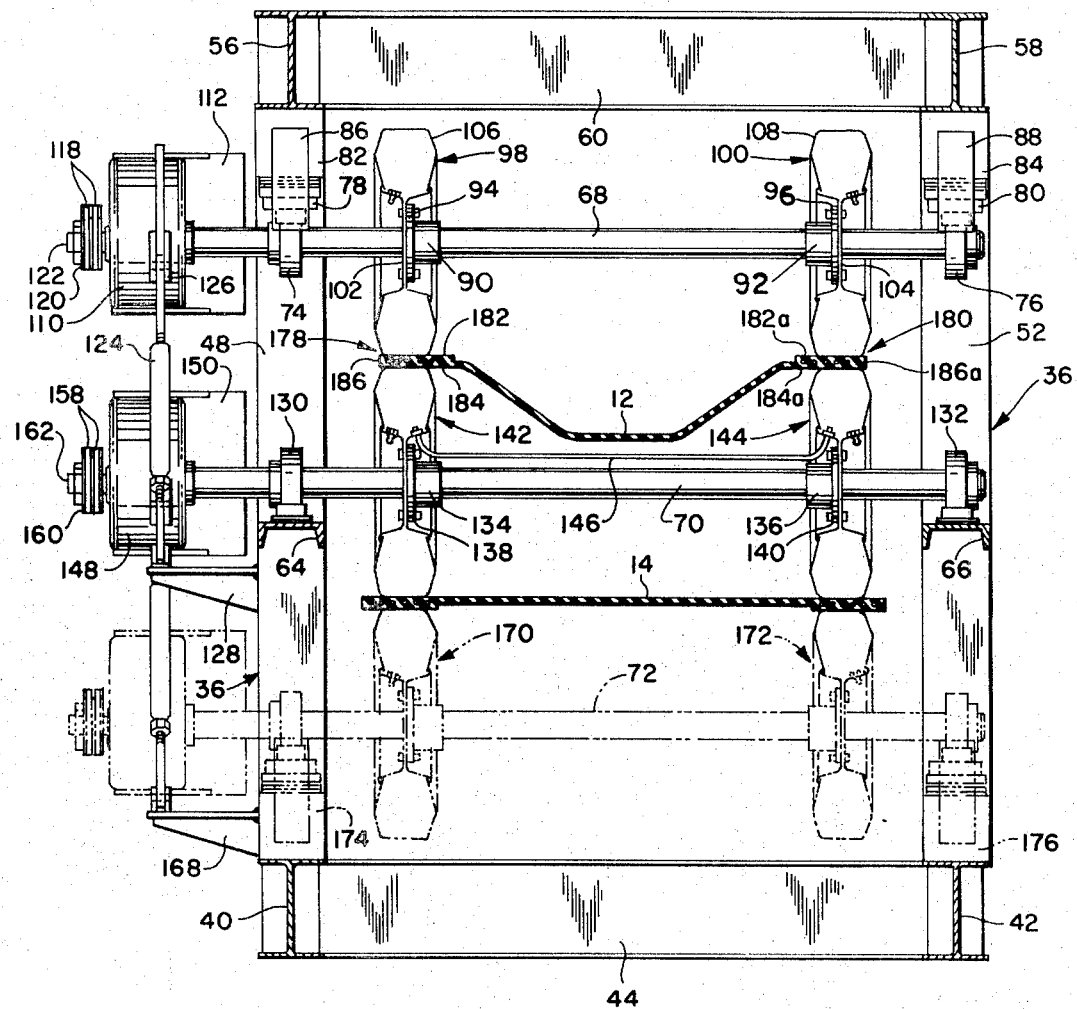
FIG. 3 is a front elevation of the drive unit shown in FIG. 2 with the vertical frame members removed to reveal mounting details for the several axles and also showing the hydraulic jacks for applying a traction load to the drive wheels engaging the marginal driving edges of the belt.

As shown in FIGS. 2 and 3, there may be provided a shaft 72 similarly arranged and fitted for pinch roll coaction with the assembly including shaft 70. In such a case, the shaft 68 and the fittings thereto applied are in the preferred instance omitted. Thus, drive units for applying power to the upper reach 12 preferably include the shafts 68 and 70 and the respective elements applied thereto as shown in solid lines in FIGS. 1 and 2. In the preferred instance, also, a drive unit for coaction with the lower reach 14 includes units as represented by shaft 70 and 72 together with the corresponding elements applied thereto and omitting the shaft 68 and elements as above described associated therewith. Tire-and-rim assemblies 170 and 172 on shaft 72 are mounted for vertical movement on hydraulic jack units 174 and 176 similarly but oppositely disposed to hydraulic jack units 82 and 84. Although the shaft 70 has been shown to be mounted so that it cannot be moved in a vertical direction, it will be understood that hydraulic jacking means such as those shown for the shaft 68 may be used in connection with the shaft 70 in any of the embodiments of the invention. It should also be understood that either one or both of the shafts 68 and 70 may be equipped for movement in a vertical direction, and that in connection with a drive apparatus for the lower reach 14 either one or both of the shafts 70 and 72 may be equipped for movement in a vertical direction.

As indicated above, the drive wheels located on shaft 68 and on shaft 70 are disposed opposite each other and define therebetween nips 178 and 180 which engage the upper and lower surfaces of the marginal drive edges of the conveyor belt upper reach 12. Thus, the tire-and-rim assembly 98 defines with its opposite member, the tire-and-rim assembly 142, a nip 178 which grips therein the marginal drive edge 186 of the upper reach 12. The tire-and-rim assembly 98 engages the upper surface 182 of the marginal drive edge 186 and the tire-and-rim assembly 142 engages the lower surface 184 of the marginal drive edge 186. In like manner, the tire-and-rim assembly 100 engages the upper surface 182a of the marginal drive edge 186a, and the tire-and-rim assembly 144 engages the lower surface 184a of the marginal drive edge 186a. The extent of traction loading within the nips 178 and 180 is controlled by the hydraulic jacks 82 and 84.

In order to maintain the alignment of the marginal drive edges 186 and 186a, there are provided inlet and outlet guide roller assemblies 188 and 190, respectively, the direction of belt travel being from left to right as shown in FIG. 2. The guide roller assemblies such as guide roller assemblies 188 and 190 serve to offset any tendency of the belt toward misalignment and escape from the nip 178, for example, which may arise. For example, if a circumferential groove, or several thereof, in the tread surface of the tire 106 failed to rotate in a plane normal to the axis of rotation of shaft 68, lateral forces tending to work the marginal edge drive edge 186 laterally to the left or to the right may be introduced. The guide roller assemblies 188 and 190 ensure against any substantial amount of "wandering" of the marginal drive edge 186.

The inlet guide roller assembly 188, then, comprises a pair of horizontally disposed guide rolls 192 and 194, respectively, coacting with the upper surface 182 and the lower surface 184 of the marginal drive edge 186. The guide rolls 192 and 194 properly locate the marginal drive edge 186 for introduction into the nip 178. A vertically axised roll 196 coacts with the edge and limits any tendency toward horizontal displacement of the upper reach 12 in combined effect with its opposite member coacting with the marginal drive edge 186a. The horizontal rollers 192 and 194 for controlling movement in the vertical direction are suitably mounted in bearing blocks such as bearing block 198 (FIG. 4) adjustably secured to an upstanding roller support 200 which is in turn suitably secured to a roller support bracket 202. The bracket 202 is attached by any suitable means such as welding to the frame 36. In like manner, the vertically axised roll 196 is likewise supported in a bearing block 204 adjustably mounted on a roller support 206 which is in turn secured to the bracket 202.

It is also convenient to provide a vertically axised guide roller 208 for coaction with the lower reach 14 of the belt 10. The roller 208 is mounted in bearing block 210 which is in turn adjustably mounted on the roller support bracket 202. The outlet guide roller assembly 190 is of similar but opposite construction to the inlet guide roller assembly 188 and in the interests of avoiding repetitious description, corresponding numbers to which have been added the letter $a$ have been provided to identify the corresponding parts.

In FIGS. 4 and 5, only the right-hand side of the upper reach 12 of conveyor belt 10 has been illustrated. It will be understood that insofar as the guide roller assemblies 188 and 190 are concerned, opposite and mirror image assemblies are provided for coaction with the left-hand marginal drive edge 186a (not shown in FIGS. 4 and 5).

Figure 6:
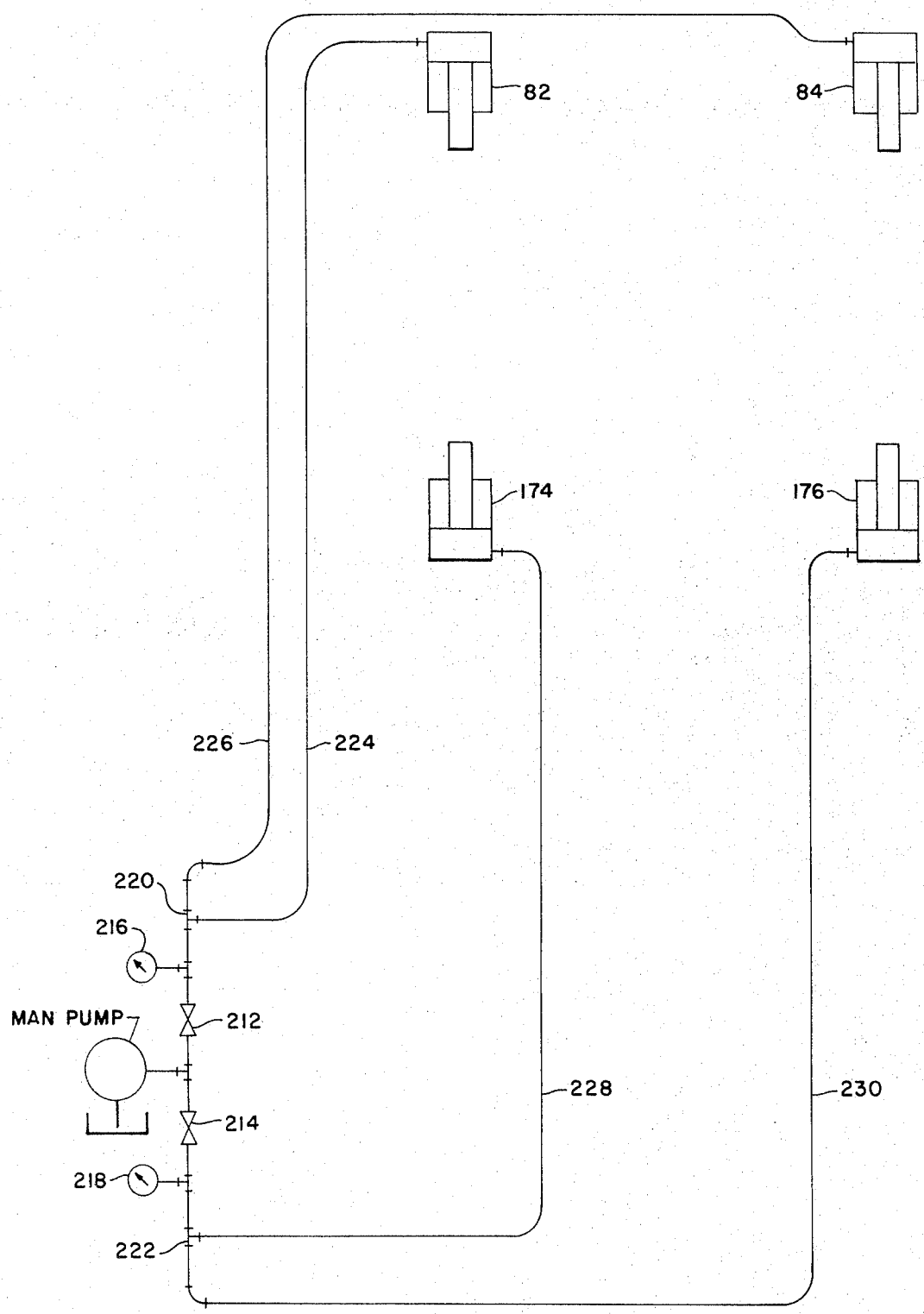
FIG. 6 is a schematic view of a hydraulic system for traction loading drive axles in accordance with the present invention.

As indicated above, the traction loading of the pinch rolls is conveniently effected by hydraulic jacks. FIG. 6 shows one form of hydraulic system which may be used in connection with the previously described apparatus. Thus, there is shown in FIG. 6 schematically and diagrammatically hydraulic jack units 82 and 84 which are single acting jacks. In th embodiment shown in FIGS. 2 – 5 inclusive, the hydraulic jacks were one-inch diameter, 3 ¾-inch stroke single-acting jacks. The hydraulic system shown operates either simultaneously or separately the jack pairs 82–84 and 174–176. A manual hydraulic pump is shown for pressurizing the system through check valves 212 and 214, respectively. The lines include hydraulic gauges 216 and 218 and T-fittings 220 and 222. A hydraulic hose line 224 communicates with hydraulic jack 82, and hose line 226 communicates with hydraulic jack 84. Both jacks 82 and 84 are therefore under the same hydraulic pressure. In like manner, hose lines 228 and 230 lead to hydraulic jacks 174 and 176, respectively.

Instead of a manual pump such as shown in FIG. 6, there may be provided a continuously operated motor driven hydraulic pump including a by-pass for maintaining the pressure in the hydraulic jack system. Still further, sensing controls indicative that more or less pressure is required through the hydraulic jack system may be provided, and the hydraulic pump made responsive thereto.

There has thus been provided a drive unit assembly for driving either one or both of the upper and lower reaches of an endless conveyor belt by applying driving power through reinforced marginal drive edges thereof. The drive units are generally modular and may be constructed at a site different from the point of use and at the time of installation the belt threaded through the drive unit. These units are adapted for location intermediate the head and tail pulleys of a long distance bulk conveyor system. The drive units in one embodiment are capable of imparting 500 horsepower, for example, to a conveyor belt and to move the belt at a speed of 800 feet per minute. Since the pneumatic rubber tires utilized in a preferred embodiment of the invention as the driving surface desirably have a lower Durometer rating than the belt surfaces against which they work, the wear is taken up in the demountable wheel rather than in the belt. Because of the utilization of a multiplicity of drive units of the types above described in a conveyor belt system, the tensile forces which the belt must withstand even when loaded are very much reduced from the tensile forces a loaded conveyor belt of equivalent length and utilizing a single head pulley drive unit must withstand. The cost of the belt itself is thus greatly reduced.

What is claimed is:

1. A drive unit for an endless conveyor belt having upper and lower reaches and marginal drive edges comprising in combination:
    a. a frame adapted to span the upper reach of an endless conveyor belt intermediate the extremities of the upper reach thereof;
    b. a first axle mounted in said frame for disposition normal to the direction of travel of said endless belt and spanning the marginal drive edges of said belt;
    c. a pair of upper drive wheels mounted on and rotatable with said first axle for driving engagement with the upper surfaces of the marginal drive edges, respectively, of the upper reach of said belt;
    d. a second axle mounted in said frame parallel to said first axle and spanning the marginal drive edges of said belt;
    e. a pair of lower drive wheels mounted on and rotatable with said second axle for driving engagement with the under surface of the marginal drive edges, respectively, of the upper reach of said belt and opposite the drive wheels mounted on said first axle;
    f. means for rotatably driving said first axle;
    g. separate means for rotatably driving said second axle; and
    h. means for traction loading between said first and second axles to pinch the respective marginal drive edges of the upper reach between the upper and lower drive wheels.

2. A drive unit in accordance with claim 1 additionally including:
    i. a third axle mounted in said frame parallel to said first axle and spanning the marginal drive edges of said belt;
    j. a pair of wheels mounted on and rotatable with said third axle for engagement with the under surface of the marginal drive edges, respectively, of the lower reach of said belt and opposite the drive wheels mounted on said second axle;
    k. means for traction loading between said second and third axles to pinch the respective marginal drive edges of the lower reach between the lower drive wheels on said second axle and the wheels on said third axle.

3. A drive unit in accordance with claim 1 in which the drive wheels on said first and second axles include pneumatic rubber tires.

4. A drive unit in accordance with claim 1 in which the traction loading means includes extensible arm means coacting between the frame and the first axle.

5. A drive unit in accordance with claim 4 in which the extensible arm means includes a pair of hydraulically actuated jacks adjacent each drive wheel, a source of liquid under pressure and means for controlling the flow of such liquid.

6. A drive unit in accordance with claim 1 in which the traction loading means includes means for equalizing the loading at each drive wheel on a given axle.

7. A drive unit in accordance with claim 6 in which the equalizing means includes a single source of hydraulic fluid under pressure, a T-connection, and separate lines including check valves leading to separate hydraulically actuated jacks located adjacent each drive wheel.

8. A drive unit in accordance with claim 1 in which the means for driving the first and second axles each includes a shaft mounted reducer, a motor, and pulley-and-belt means connecting the motor to the reducer.

9. A drive unit in accordance with claim 3 including a connection between the pneumatic tires on a given shaft whereby the pressure in each tire is equalized.

10. A drive unit for an endless conveyor belt having upper and lower reaches and marginal drive edges comprising in combination:

a. a frame adapted to span the lower reach of an endless conveyor belt intermediate the extremities of the lower reach thereof;

b. a first axle mounted in said frame for disposition normal to the direction of travel of said endless belt and spanning the marginal drive edges of said belt;

c. a pair of upper drive wheels mounted on and rotatable with said axle for driving engagement with the upper surfaces of the marginal drive edges, respectively, of the lower reach of said belt;

d. a second axle mounted in said frame parallel to said first axle and spanning the marginal drive edges of said belt;

e. a pair of lower drive wheels mounted on and rotatable with said second axle for driving engagement with the under surface of the marginal drive edges, respectively, of the lower reach of said belt and opposite the drive wheels mounted on said first axle;

f. means for rotatably driving said first axle;

g. separate means for rotatably driving said second axle; and h. means for traction loading between said first and second axles to pinch the respective marginal drive edges of the lower reach between the upper and lower drive wheels.

* * * * *